United States Patent [19]

Donelson

[11] Patent Number: 4,566,166
[45] Date of Patent: Jan. 28, 1986

[54] METHOD FOR MANUFACTURING A STAY RING BEARING STATIONARY GUIDE VANES FOR A NONGATED TURBINE

[75] Inventor: Richard K. Donelson, Aurora, Ind.

[73] Assignee: Allis-Chalmers Corporation, Milwaukee, Wis.

[21] Appl. No.: 657,256

[22] Filed: Oct. 3, 1984

[51] Int. Cl.[4] .............................................. B23P 15/02
[52] U.S. Cl. .............................. 29/156.8 R; 29/23.5; 29/557; 29/DIG. 26; 415/184; 415/186; 415/191; 415/217
[58] Field of Search ........ 29/23.5, 156.8 R, 156.8 CF, 29/156.8 B, 156.4 R, 557, 558, DIG. 26; 415/184, 186, 189, 191, 216, 217

[56] References Cited

U.S. PATENT DOCUMENTS

| | | | |
|---|---|---|---|
| 1,900,144 | 3/1933 | White | 415/217 |
| 2,977,088 | 3/1961 | Buchi | 415/186 |
| 3,005,618 | 10/1961 | Buchi | 415/184 |
| 3,176,960 | 4/1965 | Sproule | 415/129 |
| 3,440,969 | 4/1969 | Kondo | 29/156.8 R X |
| 4,473,931 | 10/1984 | Komatsu | 29/156.8 R |

Primary Examiner—Mark Rosenbaum
Assistant Examiner—Ronald S. Wallace
Attorney, Agent, or Firm—Timothy R. Conrad; Arthur M. Streich

[57] ABSTRACT

A method for manufacturing stay rings for a family of hydraulic turbine installations is disclosed. The stay ring comprises a plurality of stay vanes axially extending between two concentric ring members. Stay vanes are formed from flat plates and aligned circumferentially on the rings with radially outer leading edges presenting an intake angle acceptable for any turbine installation within a predetermined family of turbine installations. The vanes are sized such that their length measured from the leading edge to a trailing edge is such that the vane presents a discharge angle equal to a predetermined minimum discharge angle for the family of turbine installations for a given turbine installation. A desired discharge angle corresponding with a desired power output is predetermined and the trailing edges of the stay vanes are trimmed an amount sufficient for the stay vanes to present the desired discharge angle.

7 Claims, 7 Drawing Figures

METHOD FOR MANUFACTURING A STAY RING BEARING STATIONARY GUIDE VANES FOR A NONGATED TURBINE

BACKGROUND OF THE INVENTION

1. Field of the Invention

This invention relates to a method of manufacturing a stay ring for a nongated turbine. More particularly, this invention relates to a method of manufacturing a stay ring for a family of nongated hydro-turbines where the stay ring is readily modified to permit selection of a desired power output for a particular turbine to be manufactured.

2. Description of the Prior Art

The power produced by a reaction turbine at a given rotational speed is proportional to the change in angular momentum of a mass of fluid flowing through the turbine runner. An angular momentum is imparted to the motive fluid by a spiral case and guide vanes. Prior art reaction turbines were provided with two sets of guidance—a stationary set (stay vanes) which provide structural support and an adjustable set (wicket gates) which permitted adjustment in the angular momentum of fluid flowing to the turbine runner. Accordingly, with adjustable wicket gates the power output of a reaction turbine could be regulated.

Currently, there is an emphasis to develop small, low head, low cost hydraulic installations. This emphasis is due in part to the rising costs of energy and the desirable low pollution levels attainable with hydraulic power production. Due to the economies of low head hydraulic power installations, regulated reaction turbines are commonly not economically feasible due in part to the high cost of designing and manufacturing wicket gates and their linkage and control mechanisms.

To utilize low head installations without the attendant high cost of regulated reaction turbines, stay rings, which previously had been used for structural support, were modified such that the stay vanes were shaped to impart a desired angular momentum to the motive fluid. In such nonregulated reaction turbines, a desired power output for the particular turbine was determined and a stay vane was formed to provide a desired discharge angle to meet the predetermined output level. In such cases, hydraulic turbine installations could be designed for low head installations which were set at a predetermined power output.

While the use of nonregulated reaction turbines as described above broadened the number of hydraulic sites which could be economically developed for power production, many other hydraulic sites are still not being developed since they are not cost effective even with the nongated reaction turbines. The lack of cost effectiveness for sites is due in part to the fact that the stay ring for the nongated reaction turbines must be individually designed for the particular site and the particular desired power output. A method of constructing a stay vane is shown in U.S. Pat. No. 4,135,853. The costs associated with the site-by-site design can frequently be sufficiently large that many hydraulic sites go undeveloped due to the lack of commercial effectiveness. To tap the energy associated with the undeveloped hydraulic sites and to lower the cost of nongated reaction turbines in general, a method is needed to standardize the design and construction of nongated reaction turbines while permitting modification of the design to accommodate different desired power outputs.

OBJECTS AND SUMMARY OF THE INVENTION

It is an object of the present invention to provide a method for the manufacture of a stay ring for a hydraulic turbine.

It is a further object of the present invention to provide a method of manufacture of a stay ring for a hydraulic turbine where the stay ring is readily modified to permit the construction of any hydraulic turbine having a predetermined desired power output.

It is yet a further object of the present invention to provide a method of manufacture of a hydraulic turbine stay ring where the stay ring is adapted for a family of hydraulic turbines having a predetermined range of power outputs within the family where the stay ring is manufactured to accommodate the lowest power output and easily modifiable to accommodate the highest desired power output.

According to a preferred embodiment of the present invention, there is provided a method for manufacturing a stay ring for a hydraulic turbine installation where the stay ring is formed by a plurality of stay vanes secured to a ring member with the vanes circumferentially arranged on the ring member and extending therefrom. The vanes have an initial length such that the trailing edges of the vanes present a predetermined minimum discharge angle for a predetermined family of hydraulic turbine installations. A second ring is secured to the stay vanes with the second ring having a radial dimension sufficiently large such that a radially inner portion of the stay rings is exposed permitting trimming of the trailing edge of the stay vanes to a predetermined point such that the trailing edge of the stay vanes present discharge angles corresponding with a predetermined power output for a particular turbine installation within the family of hydraulic turbine installations.

DESCRIPTION OF THE PREFERRED EMBODIMENT

Figure 2:
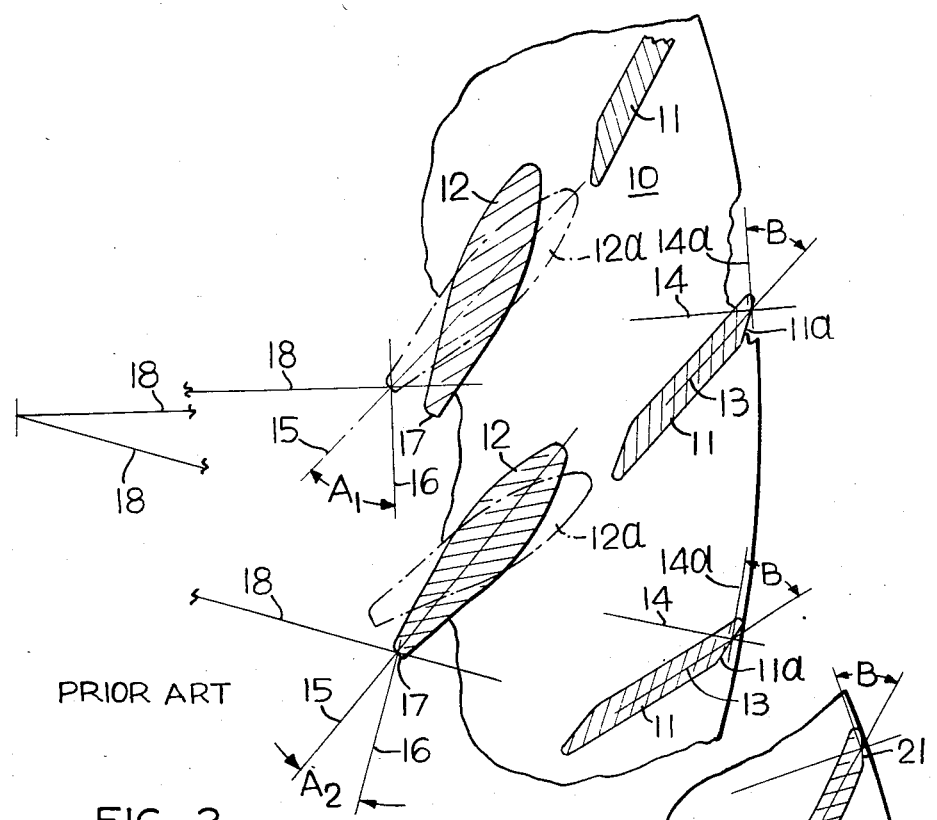
FIG. 2 shows a partial top view of a prior art turbine installation with FIG. 2 showing the stay vanes and wicket gates in cross section.

The torque and therefore the power produced by a reaction turbine is proportional to the change in angular momentum of the fluid flowing through the turbine runner. To regulate the power output of the turbine, adjustable wicket gates were provided. FIG. 2 shows a prior art stay ring 10 for a regulable reaction turbine having stay vanes 11 and wicket gates 12. In such a prior art turbine, fluid enters a spiral case from a penstock (not shown). The spiral case surrounding the stay ring, the stay ring and the wicket gates impart an angular momentum to the flow of the motive fluid. An example of such a reaction turbine having a spiral case, stay vanes and adjustable wicket gates is shown in U.S. Pat. No. 3,176,960.

As shown in FIG. 2, the stay vanes 11 of the stay ring 10 direct the flow of the motive fluid from the spiral case toward a plurality of circumferentially arranged wicket gates 12. In regulable hydraulic turbine installations having adjustable wicket gates 12, the stay vanes 11 are not provided for the purpose of imparting a desired angular component to the flow of the motive fluid, but instead are mainly provided to give structural support between the turbine headcover and the turbine base (not shown). The stay vanes 11 are designed to be aligned with the direction flow of the motive fluid entering from the spiral case and are further designed to provide good inlet flow conditions to the wicket gates.

Stay vanes 11, as those shown in FIG. 2, are provided with an inlet angle B to provide a minimum hydraulic loss as the motive fluid enters the stay ring 10 from the spiral case. As shown in FIG. 2, the inlet angle B is measured as a lesser included angle of the camber line 13 of the stay vane 11 and a line 14a perpendicular to a radial line 14 extending from the axis of the stay ring to the camber 13 at the leading edge 11a of the vane.

In hydraulic turbine design, the inlet angle B of the stay vanes 11 may be readily standardized for a given spiral case design and does not change for any given desired power output for a turbine. However, to provide a turbine with varying power output, the prior art provided hydraulic turbine installations with adjustable wicket gates 12 such as those shown in FIG. 2. The wicket gates 12 of FIG. 2 are shown in two positions. The first position indicated by the solid line profile of the wicket gate 12 presents a given discharge angle $A_2$. The gates are rotatable through a plurality of discharge angles such as the position shown by the phantom line profile 12a of the wicket gates in FIG. 2. The discharge angle of the gate 12 may be defined as the lesser included angle of the gate camber 15 and a line 16 normal to a line 18 projecting from the axis of the stay ring 10 to the camber line 15 at the trailing edge 17 of the wicket gate.

As shown in FIG. 2, as the wicket gates 12 are rotated from a first position indicated by the solid profiles with the discharge angle to a second position indicated by the phantom profile 12a, the discharge angle increases from $A_2$ to $A_1$. As the discharge angle increases, the angular momentum of the motive fluid entering the turbine runner increases with a resulting increase in power output.

Figure 4:
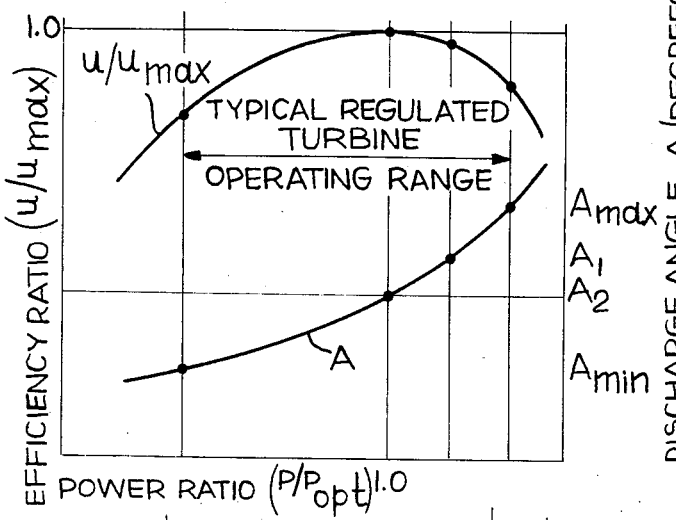
FIG. 4 is a graphical showing of performance curves for a regulated reaction turbine.

FIG. 4 shows performance curves for a regulated hydraulic turbine. The abscissa of FIG. 4 is the ratio of the power output P of the turbine to the power output $P_{opt}$ of the turbine at maximum efficiency. The left ordinate of FIG. 4 is the ratio of the efficiency of the turbine, u, to the maximum efficiency attainable for the turbine, $u_{max}$. The right ordinate of FIG. 4 is the discharge angle of the wicket gates 12 ranging from a maximum discharge angle $A_{max}$ to a minimum discharge angle $A_{min}$. The maximum and minimum discharge angles are predetermined maximums and minimums anticipated during operation of the turbine. The upper curve of FIG. 4 shows $u/u_{max}$ as a function of $P/P_{opt}$. The lower curve shows $P/P_{opt}$ as a function of the discharge angle, A.

As can be seen by FIG. 4, by adjusting the discharge angle to any given angle between the maximum and minimum, a power ratio may be selected. FIG. 4 also shows the efficiency ratio, u, of the turbine is also affected by the discharge angle of the wicket gates 12.

For example, at a given discharge angle $A_2$, the maximum efficiency of the turbine is attained with a specific power output. By increasing the discharge angle of the wicket gate (for example to $A_1$), the power output of the turbine may be increased but a loss in efficiency occurs at the increased power output.

Figure 3:
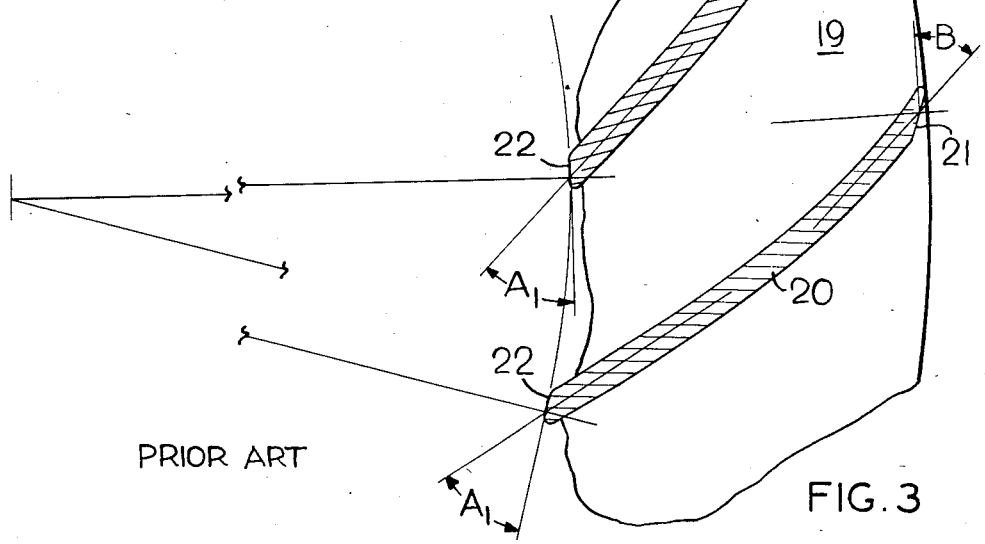
FIG. 3 is a partial top view of a stay ring of a prior art nongated reaction turbine showing stay vanes in cross section.

In small turbines for low head hydraulic installations, the flexibility of being able to regulate the turbine over a wide range of power outputs may not be necessary and indeed may be economically unfeasible due to the cost of providing the turbine installation with adjustable wicket gates. In such cases, stay rings were modified to provide stay vanes which performed the function of both the stay vane and wicket gates of the regulated turbines. That is, the stay vanes provided structural support for the turbine installation as well as providing flow control of the motive fluid entering the turbine runner. A partial showing of such a prior art stay ring 19 for a nonregulated turbine is shown in FIG. 3.

The stay vanes 20 of prior art unregulated reaction turbines were rolled such that their leading edge 21 provided an inlet angle B sufficient to accept the flow of motive fluid from the spiral case with a minimum of hydraulic loss. The vanes were rolled such that at the trailing edge 22 of the vane 20, the vane 20 presented a predetermined discharge angle $A_1$. At the predetermined discharge angle $A_1$, the flow of motive fluid entering the turbine runner has a predetermined angular momentum resulting in a fixed and determinable power output.

Figure 5:
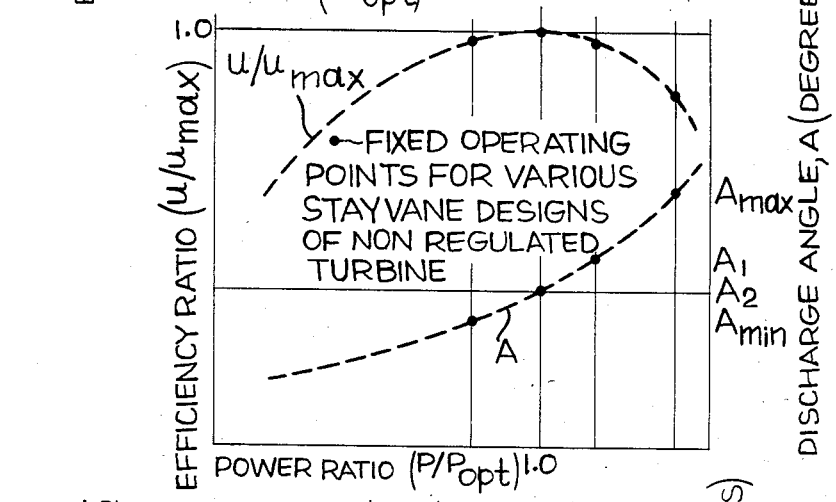
FIG. 5 is a graphical showing of performance curves for a nonregulated reaction turbine.

FIG. 5 shows performance curves for a family of unregulated reaction turbines. In FIG. 5, the values on the abscissa are the same as those of FIG. 4. The lower dotted line of FIG. 5 shows the power output ratio $P/P_{opt}$ of a family of turbines as a function of the discharge angle A at which the turbines' stay vanes are set. The upper dotted line of FIG. 5 shows the function of the efficiency ratio $u/u_{max}$ of the turbine as a function of a power output ratio $P/P_{opt}$ of the turbine. As shown in FIG. 5, once the discharge angle of the stay vanes of FIG. 3 are set at a particular angle, the power output ratio and the efficiency ratio of the turbine are fixed for the life of the turbine and may not be regulated.

In designing a particular turbine installation, the graph of FIG. 5 may be used to determine a particular discharge angle for which the stay vanes of the turbine may be designed. For example, if the maximum efficiency ratio is desired for the particular turbine installation, the relationships of FIG. 5 indicate that a discharge angle of $A_2$ and its corresponding power ratio would be required. Accordingly, to achieve the maximum efficiency ratio, the stay vanes 20 of FIG. 3 would need to be rolled with less of a curvature to present the smaller discharge angle $A_2$ while retaining the required inlet angle B. While the solid curves of FIG. 4 indicate a regulated Francis turbine may be operated over a continuous range of power outputs and corresponding efficiency ratios, the dotted curves of FIG. 5 indicate nonregulated Francis turbines can be designed for discrete power output ratios and efficiency ratios. Once the power output ratio and efficiency ratio of the unregulated turbine are set, they may not be changed. To choose a given power output ratio, the required discharge angle is selected and the turbine vanes are rolled to present the determined discharge angle while retaining the desired intake angle.

As can be determined by the foregoing, to manufacture unregulated turbines requires the stay ring to be uniquely designed and manufactured for each installation to provide a desired power output ratio and efficiency ratio for the particular installation. The unique design requirements of the prior art unregulated turbines result in high design and manufacturing costs. In many instances, these high costs make low head installations unfeasible.

To reduce the cost of the manufacture of stay rings and to standardize their design and construction, I have determined that a stay ring may be predesigned and premanufactured for a family of hydraulic turbine installations. Only a slight modification is needed for adjusting the premanufactured stay vane to provide a given turbine with a predetermined power output.

Figure 1:
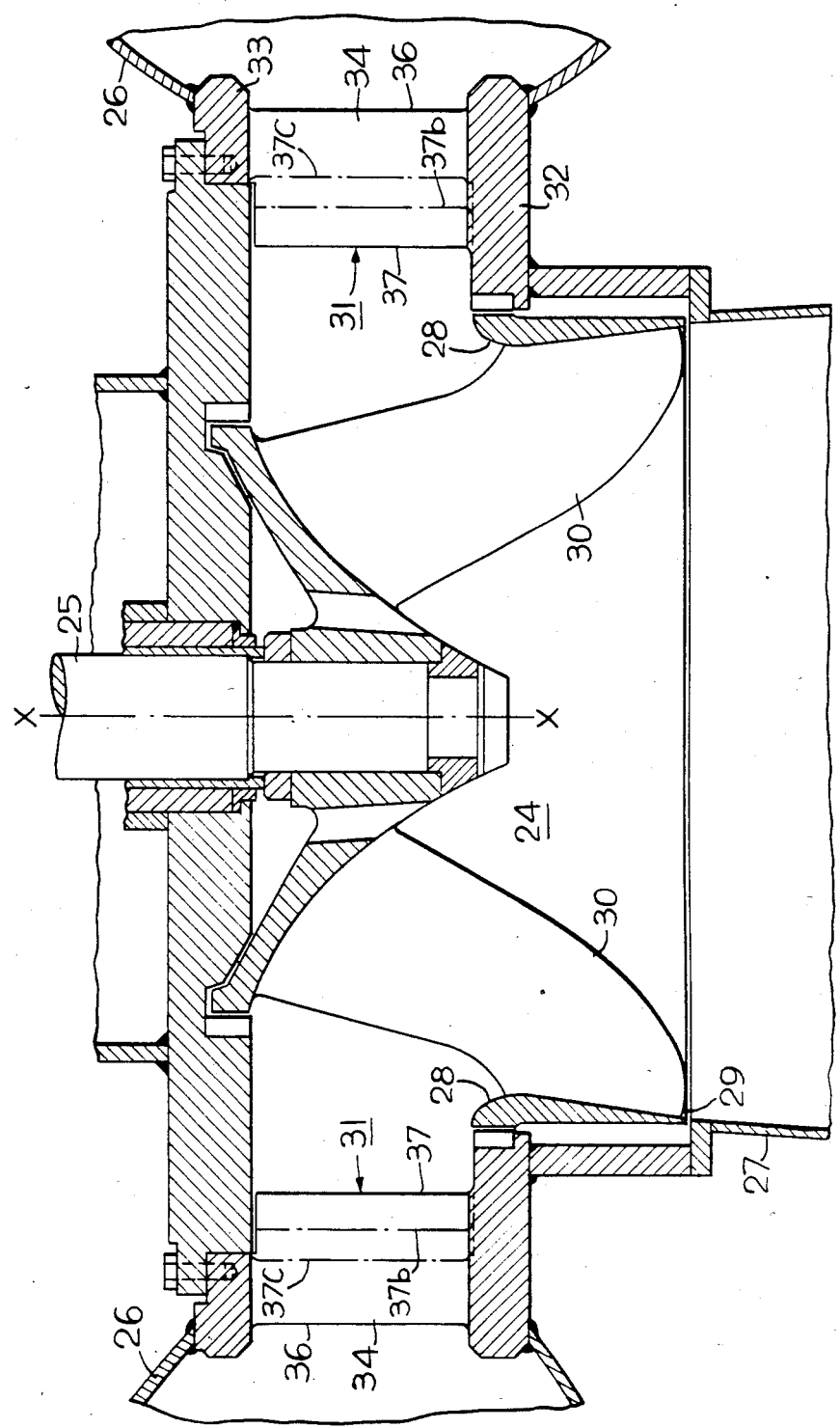
FIG. 1 is an elevation cross-sectional view of a hydraulic turbine installation having a stay ring manufactured, according to the present invention.
Figure 7:
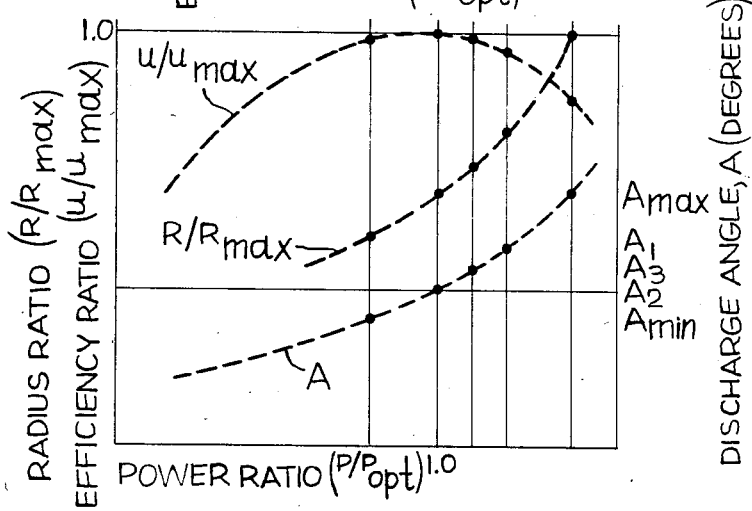
FIG. 7 is a graphical showing of performance curves for a hydraulic turbine having a stay ring manufactured according to the method of the present invention.
Figure 6:
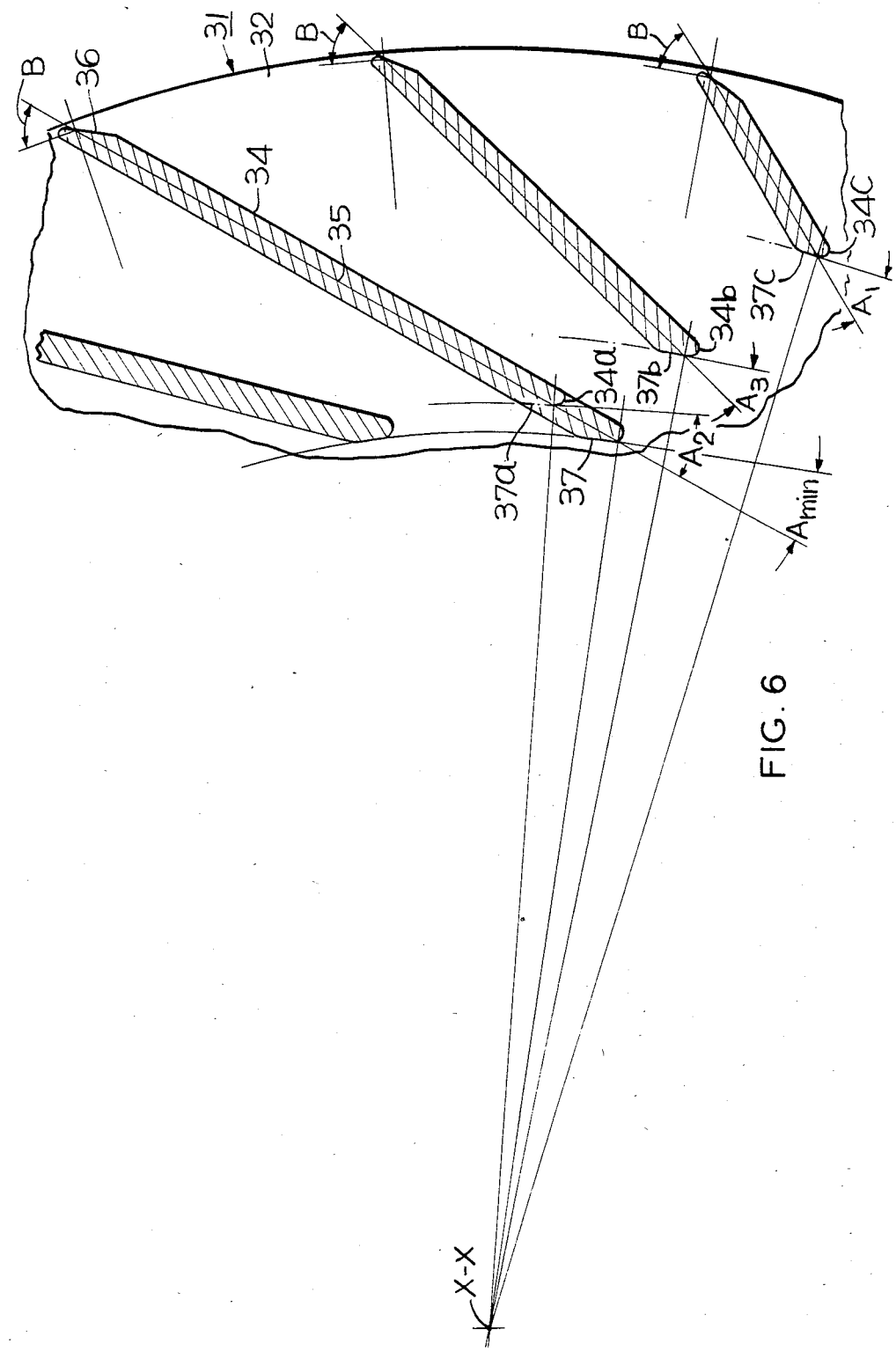
FIG. 6 is a partial top view of a stay ring for a nongated Francis turbine manufactured according to the present invention with FIG. 6 showing stay vanes in cross section, modified to present a variety of predetermined discharge angles.

Referring now to FIGS. 1, 6 and 7, a method of manufacturing a stay ring according to the present invention will be described in a preferred embodiment.

FIG. 1 shows a cross-sectional elevation view of a hydraulic turbine installation having a Francis runner oriented with a vertical rotational axis X—X and secured to a shaft 25 for rotation about the vertical axis X—X. It will be appreciated by those skilled in the art that while the present example illustrates a Francis turbine, the method of the present invention will be equally applicable to a method of manufacturing a stay ring for any type of turbine installation which accepts the motive fluid from a spiral case and directs the fluid toward a rotational axis of a turbine runner.

The turbine installation includes a spiral case 26 which surrounds the runner 24 and is connected to the source of a motive fluid by means of penstock (not shown). A draft tube 27 is provided on the discharge end of the runner. The Francis runner 24 is provided with radial openings 28 which accept the motive fluid and axial openings 29 for discharge of the motive fluid. The runner 24 is provided with a plurality of runner blades 30. The motive fluid approaching the runner blades 30 through the radial openings 28 of the runner has an angular momentum. The blades 30 are designed such that the energy of the flowing motive fluid is imparted to the runner 24 causing it to rotate. The flow of the motive fluid out of the axial opening 29 into the discharge tube 27 has as low an angular momentum as possible. The change in the angular momentum of the motive fluid entering and exiting the runner is proportional to the torque on the rotating turbine runner. Accordingly, to increase the torque and therefore the power output of the turbine, the angular momentum of the flow entering the radial openings 28 of the runner 24 must be increased.

A stay ring 31 manufactured according to the present invention is provided between the spiral case 26 and the radial openings 28 of the Francis runner 24. The stay ring 31 comprises a first ring member 32 and a second ring member 33 spaced apart and connected by means of a plurality of stay vanes 34. In a standardized unit, the ring members 32 and 33 and stay vanes 34 are manufactured from plate steel. The ring members 32 and 33 are coaxially aligned and the stay vanes 34 are welded to the ring members 32 and 33 circumferentially arranged on the ring members and extending axially between the first and second ring members 32 and 33, respectively.

With reference to FIGS. 1 and 6, each of the stay vanes 34 is formed from flat plate steel and has a planar camber 35. The stay vanes 34 are secured to the ring members with the stay vanes 34 presenting a leading edge 36 on an outer portion of the vanes facing the spiral case 26 and a trailing edge 37 on a radially inner portion of the vanes facing the turbine runner 24.

The vanes 34 are secured to the ring member with each of the vanes 34 having an inlet angle B at the leading edges 36 being identical for each of the vanes 34. The inlet angle B is selected to be a predetermined angle for receiving fluid from a spiral case for a family of hydraulic turbine installations with a minimum of hydraulic loss as the fluid enters the stay ring 31 from the spiral case 26. A family of hydraulic turbine installations will be defined here as hydraulic turbine installation designs which, regardless of desired power output ratio, can be provided with a single machine size and identical stay vane inlet angles.

For any given family of hydraulic turbine installations having predetermined common input angles, different hydraulic turbine installations within the family would have a wide variety of desirable power output ratio ranging from a maximum power output ratio to a minimum power output ratio. The range of power output ratio corresponds to a range of discharge angles for the stay vanes ranging from a maximum discharge angle $A_{max}$ to a minimum discharge angle $A_{min}$. After determining the minimum discharge angle $A_{min}$ for the family of hydraulic turbine installations, the stay vanes 34 are sized such that the length of the vane 34 measured from the leading edge 36 to the trailing edge 37 is such that the lesser included angle of a line normal to a line radiating from the axis X—X of the ring (which is coaxial with the axis of rotation) to the vane camber line 35 at the trailing edge 36 equals the minimum discharge angle $A_{min}$. In FIG. 6, vane 34 is shown unmodified presenting the full length of the vane with a minimum discharge angle $A_{min}$.

For the family of hydraulic turbine installations, a maximum discharge angle $A_{max}$ is predetermined corresponding to a maximum desired power output ratio corresponding to a given efficiency ratio. As shown in FIG. 1, the second ring member 33 of the stay ring 31 is secured by welding to an outer radial portion of the stay vanes 34.

As constructed, a stay ring 31, comprising the first and second ring members 32 and 33 and the plurality of unmodified stay vanes 34, is suitable for any turbine within the family of hydraulic turbine installations to operate at the minimum desire output ratio. A stay vane so manufactured can be readily modified for a given turbine within the family of hydraulic turbine installations to have a different predetermined desired power output ratio within the predetermined range. A discharge angle associated with a predetermined power output ratio is determined and the trailing edge of each of the stay vanes is trimmed an amount sufficient for the vanes to present the desired discharge angle.

FIG. 6 shows stay vanes trimmed at 34a, 34b and 34c in amounts sufficient for the vanes to present three discharge angles $A_2$, $A_3$ and $A_1$, respectively, between the minimum and maximum angles, $A_{min}$ and $A_{max}$. As can be seen from FIG. 6, as the trailing edge of a vane is trimmed, the discharge angle A correspondingly increases. After each trimming, the trailing edge surface (37a, 37b and 37c) is shaped to present an arcuate surface having a radius measured from the trailing edge to the axis of the stay ring. The discharge angle may now be described as a lesser included angle of a camber of the stay vane and a line tangent to the arcuate surface at an intersection of the camber and a radius line. In FIG. 6, stay vane 34 is shown having its fully extended length presenting a minimum discharge angle $A_{min}$. Superimposed on the fully extended stay vane 34 is a trimmed stay vane 34a indicated by the phantom line with the trimmed stay vane presenting a slightly larger discharge angle $A_2$. Likewise, stay vanes 34b and 34c show progressively trimmed stay vanes presenting progressively larger discharge angles $A_3$ and $A_1$, respectively.

With reference to FIG. 7, a graph is shown for the performance characteristics of a family of turbines having stay rings manufactured according to the method of the present invention. On FIG. 7, the abscissa and ordinates are identical to the abscissa and ordinates of FIGS. 4 and 5 with the additional left-hand ordinate of FIG. 7 being the ratio of the inner radius, R, of the stay ring to the maximum inner radius, $R_{max}$, of the stay ring measured from the axis of the ring to the trailing edge of the stay vanes. As shown in FIG. 7, the function of the radius ratio to the power output ratio is an increasing line as the power output ratio increases. The three intermediate discharge angles corresponding with the trimmed vanes of FIG. 6 are shown on FIG. 7 indicating that a stay ring manufactured according to the method of the present invention may be easily modified to permit design of a hydraulic turbine installation within the family of installation having a predetermined desired power output ratio and corresponding to an efficiency ratio. It can be further seen in FIG. 7, a desired power output ratio can be achieved by determining the stay ring radius ratio corresponding with the desired power output ratio and trimming the trailing edge of the stay vanes to achieve the determined radius ratio. Accordingly, with a stay ring manufactured according to the present invention, stay rings for a family of hydraulic turbine installations may be standardized and premanufactured prior to the design of any given installation. Once a given installation is designed and its desired power output ratio is determined, the trailing edge of the prefabricated standardized stay ring vanes may be trimmed to achieve the desired radius ratio corresponding with the desired power output ratio. This standardization and prefabrication of the stay ring eliminates the excessive cost in terms of design manufacture associated with custom design and custom manufacturing of stay rings for each low head installation of a nongated, nonregulated hydraulic turbine installation.

From the foregoing detailed description of the present invention, it has been shown how the objects of the invention have been obtained in a preferred manner. However, modifications and equivalents of the disclosed concepts such as readily occurred to those skilled in the art are intended to be included in the scope of this invention. Thus, the scope of this invention is intended to be limited only by the scope of the claims as are or may hereafter be appended hereto.

The embodiments of the invention in which an exclusive property or privilege is claimed are defined as follows:

1. A method of manufacturing a stay ring adapted for a hydraulic turbine installation comprising:

forming a plurality of stay vanes;

securing said stay vanes to a ring member with said stay vanes circumferentially arranged on said ring member and extending axially therefrom with each of said vanes presenting a trailing edge on a radially inner portion of said vanes;

determining a desired discharge angle for said stay vanes based upon a predetermined desired angular momentum for fluid entering a runner of a given turbine installation;

trimming said trailing edge of said stay vanes an amount sufficient for said vanes to present said desired discharge angle.

2. A method according to claim 1 comprising:

predetermining a minimum discharge angle for a family of hydraulic turbine installations having a predetermined range of desired angular momentums for fluid entering a runner of a given turbine installation within said family;

sizing said stay vanes and securing said vanes to said ring member with vanes presenting said minimum discharge angle prior to trimming said vanes.

3. A method according to claim 2 comprising:

forming said stay vanes with a generally planar camber.

4. A method according to claim 3 comprising forming said stay vanes to be generally flat.

5. A method according to claim 4 comprising securing said stay vanes to said ring members with said vanes presenting a leading edge on a radially outer portion of said vanes with said vanes presenting an intake angle at said leading edge equal to a predetermined angle for receiving fluid from a spiral casing for said family of hydraulic turbine installations.

6. A method according to claim 5 comprising shaping said trimmed trailing edge to present an arcuate surface having a radius measured from said surface to the axis of said stay ring.

7. A method according to claim 6 comprising measuring said discharge angle as a lesser included angle of said camber and a line tangent to said arcuate surface at an intersection of said camber and said radius.

* * * * *